(No Model.)
C. W. BROWN.
TELEPHONE TRANSMITTER.
No. 386,380. Patented July 17, 1888.
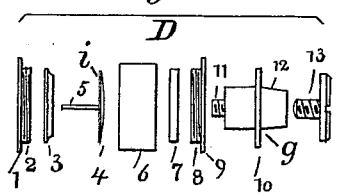
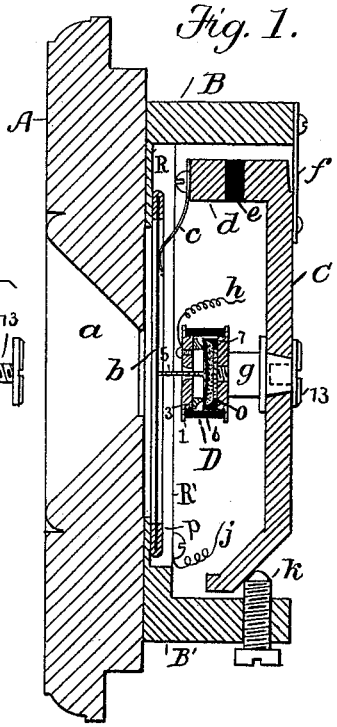
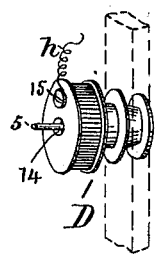
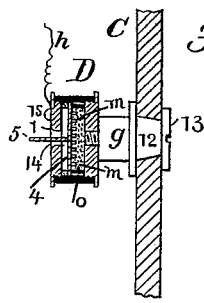
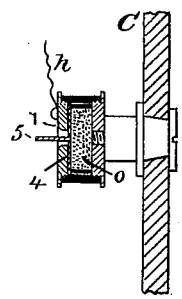
Witnesses.
Geo. Willis Pierce
Philip ___
Inventor.
Charles W. Brown
by A. Pollok
his attorney.

UNITED STATES PATENT OFFICE.

CHARLES W. BROWN, OF MONTREAL, QUEBEC, CANADA, ASSIGNOR TO THE AMERICAN BELL TELEPHONE COMPANY, OF BOSTON, MASSACHUSETTS.

TELEPHONE-TRANSMITTER.

SPECIFICATION forming part of Letters Patent No. 386,380, dated July 17, 1888.

Application filed May 18, 1888. Serial No. 274,260. (No model.)

*To all whom it may concern:*

Be it known that I, CHARLES W. BROWN, of Montreal, in the Province of Quebec and Dominion of Canada, have invented certain Improvements in Telephone-Transmitters, of which the following is a specification.

This invention relates to telephone-transmitters, and especially to those of that class wherein the essential variations of current are effectuated by means of corresponding variations in the resistance of a quantity of finely-divided, granulated, or powdered carbon, or like material in a loose and free state, when the said granulated material is interposed in and arranged to form a part of the electric circuit conveying the current, the requisite changes in the resistance of this material being produced by subjecting it to the influence of a vibratory diaphragm adapted to be controlled by the sound-waves of the human voice.

Heretofore and prior to my invention it has been customary to arrange a horizontal diaphragm closing the lower end of a short cylinder having non-conducting sides, and to inclose the granulated current-varying material upon the upper surface of the said diaphragm within the chamber, and then to connect the diaphragm with the electric circuit, causing it to serve as one of the electrodes thereof, a second electrode being embedded or immersed in the granulated mass. Transmitters have also been constructed in which the granulated current-varying material has been placed upon an elastic and extensible floor closing the chamber, and in which, while one electrode, as before, is buried in the said mass, the diaphragm (mounted, however, thereover instead of thereunder) serves also as the other electrode. In this form the granular matter is retained electrically in contact with the diaphragm through the agency of the elastic chamber-floor, which exercises, at least measurably, the functions of a spring. It has also been proposed heretofore to combine with a vertically-arranged diaphragm a cell or chamber containing powdered carbon and a pin attached to the center of the diaphragm and making contact with the carbon particles, said pin also bearing against a rubber disk, whereby the carbon is more or less compressed. In another telephone-transmitter devised prior to my invention there is employed as the current-varying medium a mass of finely-divided carbon inclosed in a case consisting of a soft-rubber ring or tube with vertical front and back plates of metal, the variations in pressure of the carbon particles between said plates being effected by a screw attached to the diaphragm.

All the forms which heretofore (so far as I am aware) have been proposed for transmitters utilizing granular carbon involve novel and costly construction, or at all events they are not adapted for use in connection with the ordinary and standard Blake transmitter cases and connections. Hence, notwithstanding the recognized superiority (in point of volume of current and loudness of transmission) of granular-carbon transmitters, when compared with transmitters of the button or single and multiple contact types, the former have gone into use to a comparatively small extent. The invention I am about to describe is, on the contrary, especially adapted for easy and cheap attachment to Blake transmitters, being substituted therein for the usual platinum and carbon button electrodes. It is capable of transmitting in louder tones, its volume increases rapidly as battery-cells are added, and it is, moreover, extremely constant, does not pack, and is of low normal resistance.

The invention comprises a small containing-case with metal back and front plates and a non-conducting rigid side wall. This case has a small orifice at the center of the back plate through which the granulations are introduced, the orifice then being closed by a screw-plug upon the end of a metal stem, the other end of the said stem being adapted for mounting upon the center of the adjusting-lever of the Blake transmitter. The metal plate closing the front end of the chamber is very thin, and while rigidly clamped at its edge by a ring and a screw gland is quite elastic at its center and is in fact an auxiliary diaphragm, and by means of a light metal rod which projects outwardly from its center and which is adjusted to just touch the center of the main diaphragm sufficient motion is imparted thereto by the vibrations of the said diaphragm to cause a material variation in the resistance of the inclosed current-varying material through which the battery-current is conducted. Thus it will be seen that the chamber or containing-cell as a whole is mounted upon the adjusting-lever of the Blake transmitter, and that a rod attached to its front plate is in delicate but permanent contact with the principal diaphragm thereof, the said diaphragm being clamped at but a single point and dampened as usual.

My invention provides, then, that a sufficient amount of the granulated material shall be inclosed between two metal plates separated by a rigid ring, one of the said plates being unyielding and the other elastic and yielding at its center, though rigidly clamped at its edges, and that the closed cell and its contents thus formed shall be mounted upon the adjusting-lever of a Blake transmitter or of some similar contrivance and in such a position with reference to a vibratory diaphragm as to be at all times operated and controlled thereby.

It also consists in the details of construction of the said containing-cell, which may be called a "button-cell."

In the drawings which constitute a part of this specification, Figure 1 is a vertical central cross-section of the invention embodied in the form of a Blake transmitter. Fig. 2 is a perspective view of the button cell attached to a portion of an adjusting-lever or other suitable support. Fig. 3 shows the several component parts of the said cell taken apart or as they appear before being put together. Figs. 4 and 5 illustrate modifications in construction.

A is the front of an ordinary Blake transmitter-case, (not shown,) and $a$ is a central flaring mouth-piece therefor. On the inner surface of this front piece is fixed a metallic ring-seat, R, for the reception of a vibratory diaphragm, $b$, which lies in a depression of the said ring-seat surrounded loosely by a flange, R'. The usual condensing or vocalizing chamber is thus provided by the interposition of the thickness of the ring-seat between the diaphragm and the inner surface of the transmitter front. Mounted upon opposite points at the top and bottom of the said ring-seat, and preferably integral therewith, are two brackets, B and B'. To the uppermost bracket, by means of a piece of spring metal, $f$, screwed to both, an adjusting-lever of ordinary form is attached, and this lever extends nearly to the lower bracket, where it ends in an angular piece on which an adjusting-screw, $k$, passing through the lower bracket, B', impinges and whereby adjustments can be made. The diaphragm $b$, in a manner well understood, is clamped at but one of its side edges, so that it is held comparatively loose and free to vibrate. Its edge is surrounded by a ring of soft rubber, $p$, which overlaps both sides, insulating the diaphragm from the other metallic portions of the apparatus.

So far I have described nothing new. Upon the inner end of a lug, $d$, projecting inwardly from the upper end of the adjusting-lever, is mounted a dampening-spring, $c$, secured by a screw, and by so mounting this spring (which is adapted to check the initial vibrations of the diaphragm and to abbreviate each artificial vibration, so that the vibrations will not run into and confuse one another) it is caused to press the diaphragm with a greater or less degree of force according to the adjustment of the lever C and screw $k$.

I will now describe in detail the construction of the containing-cell D. Although this as I prefer to make it is composed of eight pieces, it can be made very cheaply in quantity, there being in fact very little work in any of the pieces.

Referring to Fig. 3, a short cylinder, 6, of hard rubber or like material, is first provided, threaded internally. The back plate, 9, which has a threaded flange, 8, is gold-plated on its internal surface and is screwed into one side of the cylinder 6, forming the conducting rear wall of the chamber which is to contain the current-varying material. A very light ring, 7, of hard and rigid non-conducting material, which fits easily but snugly within the cylinder 6, is now slid thereinto and pushed down until it reaches the back plate, 9. This forms a rigid or inelastic side wall for the containing-cell and has a flat inner edge where it bears against the back plate. The face of its opposite edge may also be flat, but is preferably formed with a curved countersink, in which, when the appliance is put together, fits the edge of the front plate or auxiliary vibrating diaphragm, which also preferably has a concavo-convex cross-section, the convex side being inward and in contact with the non-conducting-ring 7. This feature—viz., the curved countersink—is, however, not essential, and should the outer face of the edge of the ring be flat the front plate will also be left flat. The said auxiliary vibrating plate 4 is gold-plated on its inner face, is extremely thin, and has attached to the center of its outer face, $i$, a light metal rod, 5, sufficiently long to reach under proper adjustments the center of the diaphragm $b$, as shown in Fig. 1. The light metal ring or washer 3 is then slipped over the rod and into the cylinder or sleeve 6. It thus rests on the edge of the thin plate 4. A brass gland, 1, having a threaded flange, 2, is then screwed into the cylinder and clamps the ring 3, holding the edges of the thin front plate firmly, but not pressing at all upon the center thereof. As may be seen by Fig. 2, the light rod 5 passes freely through the central hole, 14, in the gland 1.

It should be stated that the outer end of the rod 5 is not in any way attached to the diaphragm, but is simply to be adjusted into permanent mechanical contact therewith.

Considering the button-cell thus constructed as a whole, it is evident that a very small flat chamber having a rigid and inelastic non-conducting circumferential side wall, a plated, rigid, and flat rear wall, and a plated but centrally-yielding front wall is now at our disposal.

A screw-hole perforates the center of the rear plate, 9, and through this aperture the chamber is filled with granular carbon, o. This hole is then closed by the attachment of the screw-plug 11 of the metal stem g. The portion 12 of this stem is fitted to a hole in the center of the adjusting-lever and attached thereto by a screw, 13, entering the reverse side of the said lever. The appliance then presents the appearance shown in Fig. 2.

The front plate of the containing-cell is connected, by means of the metal ring 3 and the screw-gland 1, with the wire h. In practice this wire is led to the insulated piece d on the end of the adjusting-lever lug and from thence to a suitable binding-screw. The rear plate, 9, connects, by means of the stem g, with the lever c, and thus with the metallic frame, to which a leading-out wire, j, may be attached, this being continued in practice to a second or complementary binding-screw. The circuit is by these instrumentalities caused to pass through the granular inclosed material, o, and the current flowing therein is subjected to the variations produced in the said material by the reciprocatory motions of the center of the front plate, 4.

Figs. 4 and 5 show modifications in the construction of the containing-cell. In Fig. 4 the only difference lies in the fact that the front plate, 4, is provided on its inner surface with a number of projecting points, m, which extend into the granulated material, thus multiplying the points of varying contact and decreasing the normal resistance between the front and back plates. Fig. 5 shows a deeper interior to the chamber containing the granulations o. The packing-ring is also dispensed with, and the front plate, 4, is clamped directly by the gland 1.

In operation it is not at first easy to see how the very slight movements which the central portion of the auxiliary diaphragm or front plate, 4, has the capacity of making can result in such material changes of the resistance medium as are indicated by the volume of the reproduced tones. It is, however, evident upon consideration that the external diaphragm when vibrating inwardly pushes the auxiliary diaphragm also in the same direction, and that the latter is sufficiently resilient to follow the former closely in its retrograde movement; further, that, inasmuch as the mass of granular material is very small and its normal resistance clearly very low, a very small change in the said resistance bears a greater ratio to the total resistance of the mass than it would were the normal resistance high.

The advantages accruing from the construction which I have described have been partly enumerated. To recapitulate I am enabled by its use to utilize the more pronounced variations of granular carbon without the necessity of a horizontal diaphragm.

By combining the granular carbon-cell with a vertically-mounted diaphragm I am enabled to avail myself of an unclamped diaphragm capable of making free and untrammeled vibrations, kept, however, completely under the control of the voice by the application of the dampening-spring. Such a transmitter, moreover, experience has demonstrated is very constant in tone and volume, does not pack, and responds closely to the increase of battery. Furthermore, by the ability to apply the granulation-containing cell to the case and adjusting appliances of the Blake transmitter I am enabled to produce a greatly superior instrument, retaining, however, the form of instrument with which the public is already familiar, no additional education therefor being required.

It will be observed from the different forms shown that my improvements can be considerably varied in size without materially affecting the efficiency of operation. I have, however, obtained the best results from an instrument in which the containing-cell has a width of about three-eighths of an inch and a depth of not more than one-sixteenth of an inch, while the front plate has a thickness of but from three to five thousandths of an inch, and its rod 5 projecting therefrom a thickness of one-twentieth of an inch.

The transmitter described herein is, of course, to be employed preferably in association with an induction-coil, as usual, although upon very short circuits it is fully operative when introduced into the main line.

Having now described my invention, I claim—

1. In a telephone-transmitter employing granulated conducting material as the current-varying medium, the combination of a vibratory diaphragm having free edges with a vertically-mounted granulation-containing cell comprising a vertical metal back plate, a rigid non-conducting annular side wall, an elastic and yielding metal front plate acting as an auxiliary vibrating diaphragm, a mass of granulated conducting material inclosed between the said plates and thereby included in an electric circuit, a centrally-perforated metal gland clamping the same, and a rod attached to the center of the said front plate and passing through the central perforation of the gland to a mechanical connection with the outer diaphragm, whereby the vibrations of the outer diaphragm are transmitted to the front plate of the said cell and to the granulations, substantially as described.

2. The combination, substantially as hereinbefore described, of the compound granular carbon button comprising a mass of granulated carbon inclosed between a rigid metal plate and an elastic and centrally-vibrating metal plate, the said plates being separated electrically by a rigid non-conducting ring, with an external vibrating diaphragm, the said compound button being mounted vertically in proximity to the vibratory diaphragm, the center of the button being approximately opposite to the center of the said diaphragm, and the centers of the vibrating diaphragm and the elastic front plate of the button being mechanically united by a rod, whereby the vibrations of the former are transmitted to the latter, as described.

3. In a telephone-transmitter, the combination, with a vibratory diaphragm loosely supported in a ring-seat and adapted to receive sound-waves, of a hollow button supported opposite thereto, having an elastic metal front plate serving as an auxiliary diaphragm, a rigid metal back plate separated electrically therefrom by a ring of hard rubber and carbon granulations interposed in the chamber thus formed, and a rod attached to the center of the auxiliary diaphragm and in contact with the main diaphragm, so that the vibrations of the latter may be communicated to the former, both diaphragm and hollow button being vertically mounted, substantially as hereinbefore described.

4. In a granular carbon transmitter, the compound containing-cell and contents comprising an external cylinder, a rigid metal back plate closing one end of said cylinder, constituting one electrode of the said cell and centrally perforated for the introduction of the granulations, a rigid and non-elastic ring within the external cylinder and in contact with the said rear wall and forming the non-conducting side wall of said cell, an elastic metal front plate supported by said ring and clamped at its edges by a metal ring, and a screw-gland closing the other end of the external cylinder, whereby the said elastic plate is fixed opposite to the back plate, the central portion thereof being free to vibrate, granular carbon interposed between the said plates, and a screw-plug closing the central aperture of the back plate for the purpose of retaining the carbon therein.

5. The combination of an ordinary Blake transmitter case, diaphragm, and adjustment lever and screw with the hereinbefore-described granulation-containing cell, the granulations being contained between a rigid back plate and a centrally elastic front plate, forming electrodes of an electric circuit, separated electrically at their edges by a rigid and non-conducting ring in such a manner as to form a shallow chamber for the reception of said granulations, the said cell being suitably mounted upon the central portion of the adjusting-lever opposite the central portion of the Blake diaphragm, and the front plate or auxiliary diaphragm thereof being provided with a light rod attached to its center and projecting outwardly therefrom to a delicate but permanent mechanical contact with the center of the main diaphragm, whereby the vibrations of the latter are communicated to the former, for the purpose specified.

6. The combination, with the vibratory diaphragm and adjusting-lever of a Blake transmitter, of a compound granular carbon button mounted upon the center of the said lever so that its center is in the same horizontal plane as the center of the said diaphragm, the said button comprising carbon granulations inclosed between a rigid back electrode and a vibratory elastic front electrode clamped at its edge and adapted to serve as an auxiliary diaphragm, the said electrodes being separated by a non-elastic and non-conducting ring, and means, as indicated, for producing in the auxiliary diaphragm the vibrations of the main diaphragm, substantially as described.

7. In combination with the vibratory diaphragm and adjusting lever and screw of an ordinary Blake transmitter, (so called,) the hereinbefore-described hollow button containing granular carbon and closed in front by a metal elastic vibrating plate constituting an auxiliary diaphragm, the said hollow button being mounted upon the central portion of the adjusting-lever in line with the center of the main diaphragm, the center of the auxiliary diaphragm having a mechanical connection with the center of the main diaphragm, so as to participate in its vibrations, and the hollow button being provided with suitable electrical connections whereby it is adapted for inclusion in an electric circuit, substantially as described.

8. In a telephone-transmitter, a shallow chamber containing granular current-varying material inclosed between two metal plates constituting the electrodes of an electric circuit and uniting the same electrically, one of the said plates being rigid and the other elastic, an adjustable lever supporting the said chamber vertically by means of the rigid plate thereof, a vibratory diaphragm loosely mounted to vibrate freely in a vertical plane, a rod extending outwardly from the elastic plate of the said chamber, an adjusting-screw controlling the said lever and adapted to adjust the same and to bring the free end of the rod into contact with the said vibratory diaphragm for the purpose of forming a mechanical connection between the said diaphragm and the front plate of the carbon-containing chamber, and electrical connections whereby the granulations and their inclosing-plates may be included in an electric circuit, substantially as described.

In testimony whereof I have signed my name to this specification, in the presence of two subscribing witnesses, this 16th day of May, 1888.

C. W. BROWN.

Witnesses:
C. F. SISE,
CHAS. P. SCLATER.